United States Patent [19]

Hiratsuka et al.

[11] 3,743,786

[45] July 3, 1973

[54] SIGNAL LEVEL SUPERVISING SYSTEM FOR A PULSE CODE MODULATION COMMUNICATING SYSTEM

[75] Inventors: Ken-Ichi Hiratsuka, Setogaya-ku, Tokyo; Daizo Kawakami, Funaboshi-shi; Haruo Kaneko, Minomitama-gun, Tokyo; Tsuyoshi Takahashi, Kawasaki-shi, all of Japan

[73] Assignees: Nippon Telegraph & Telephone Public Corporation, Tokyo-to; Nippon Electric Company Limited, Tokyo, Japan; part interest to each

[22] Filed: Oct. 13, 1971

[21] Appl. No.: 189,010

[52] U.S. Cl. ........................ 179/15 BP, 179/15 BW

[51] Int. Cl. ............................................. H04j 1/04

[58] Field of Search .................... 179/15 FD, 15 BP, 179/15 BY, 15 AP, 15 BW, 15 BM

[56] References Cited

UNITED STATES PATENTS

| | | | |
|---|---|---|---|
| 3,261,922 | 7/1966 | Edson | 179/15 BP |
| 3,499,994 | 3/1970 | Lord | 179/15 BP |
| 3,622,707 | 11/1971 | Golembeski | 179/15 BP |

*Primary Examiner*—Ralph D. Blakeslee
*Attorney*—Richard C. Sughrue, Donald E. Zinn, J. Frank Osha et al.

[57] ABSTRACT

A signal level supervising system for a pulse code modulation communication system transmitting pulse code modulation signals representing frequency division multiplex signals containing a pilot signal, the pilot signal being used for signal level supervision purposes. Pilot signal recovery is provided by modulating the decoded frequency division multiplex signal with a carrier, derived from a pulse source used in the control of the pulse code modulation system, to frequency shift the decoded frequency division multiplex signal in a direction to increase the signal bandwidth ratio. The pilot signal is extracted from this frequency shifted signal.

10 Claims, 2 Drawing Figures

SIGNAL LEVEL SUPERVISING SYSTEM FOR A PULSE CODE MODULATION COMMUNICATING SYSTEM

This invention relates to a transmission signal level supervisory system for a pulse code modulation (PCM) communication system adapted to transmit PCM signals representative of frequency division multiplexed (FDM) telephone signals and the like.

There is a well known supervising system for a wide-band signal transmission system, wherein a pilot signal having a predetermined level and frequency is inserted to the wide-band signal at the transmitting end, and the pilot signal is detected by a band pass filter at the receiving end to supervise the transmission level of the PCM communication system. The pilot signal detection accuracy of the system may be adversely affected if the band pass filter having a relatively wide pass band is used because signals other than the pilot signal may affect the pilot signal level. However the design of the band pass filter with a sufficiently narrow pass band is extremely difficult and even if possible, it would be costly to manufacture. There is a conventional method for detecting the pilot signal after shifting the wide-band signal to a lower frequency range. Since the band width remains the same even at the lower frequency region, the band width ratio in the lower frequency region is greater than that in the original higher frequency range. This facilitates the design of the band pass filter.

In the supervising system for the PCM communication system adapted to FDM signals, the same principle as in the above-mentioned frequency division multiplex communication system is applicable. One of the conventional carrier wave sources for the frequency shift is the carrier wave supply equipment used in a FDM system. Another of the conventional carrier sources is an oscillator installed in the PCM system. The former source is not favorable because the supervising system must necessarily range over two different types of communication systems. On the other hand, the latter source not only complicates the supervising system but also lowers its reliability. It is obvious that maintenance and inspection work becomes complicated and time consuming. It is desirable that even if two different systems are connected, each equipment is to be independent of each other.

The object of the present invention is therefore to provide a high reliability level supervising system for a PCM communication system, wherein an independent level supervision is possible without increasing the scale of system.

Generally, in the PCM communication system, various pulse trains obtained by frequency-dividing a clock pulse are used as control pulse trains for various constituents. Amoung those pulse trains, there is one having a feequency between ½ to 2 times the maximum frequency of the transmission band width. This example is the sampling pulse or further divided sampling pulses used for the synchronizing function of the PCM communication system.

The level supervising system for a PCM communication system according to the present invention is characterized in that at the receiving end of the PCM communication system for transmitting FDM signals containing a pilot signal for the level supervising purpose, the recovered FDM signals are frequency shifted by using a carrier wave obtained from pulse sources for the PCM system so as to extend the band width ratio for the extraction of the pilot signal, and then the pilot signal is extracted from the frequency shifted FDM signal.

Now, the present invention is explained in detail referring to the attached drawings, wherein.

Figure 1:
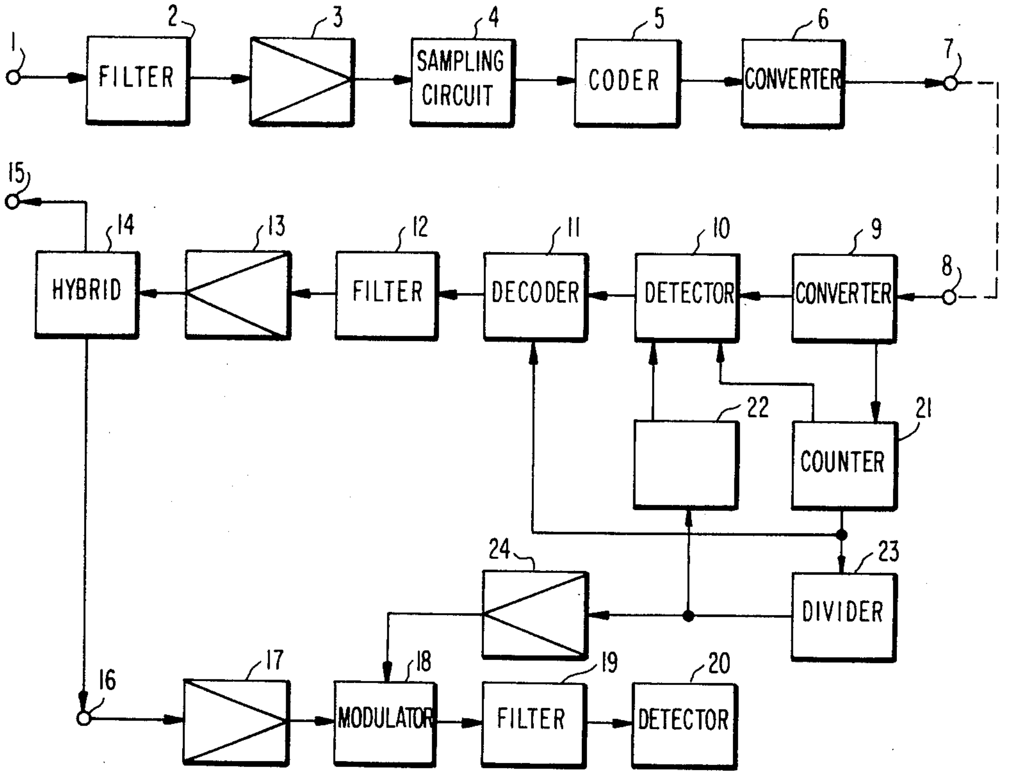
FIG. 1 is a block diagram showing an embodiment of the present invention.

Referring to FIG. 1, numeral 1 denotes an input terminal for the FDM signal containing the pilot signal within the transmission band thereof; 2, a filter; 3, an amplifier; 4, a sampling circuit; 5, a coder; 6, an output pulse converter; and 7, a PCM signal output terminal. Those constituents construct a well-known PCM coder. It is noted that the illustration of the synchronizing circuit is omitted for simplicity of illustration. Numeral 8 denotes an input terminal for the PCM signal; 9, an input pulse converter; 10, a synchronizing detector; 11, a decoder; 12, a filter; 13, an amplifier; 21, a counter; 22, a synchronizing pattern generator and 23, a divider. Those constituents construct a well-known PCM decoder for the reproduction of the original analogue signal from the PCM signal. The conventional PCM coder and decoder are detailed in the following articles:

1. J.S. Mayo: Experimental 224 Mb/s PCM Terminal (BSTJ Nov., 1965); and
2. C.G. Davis: An Experimental Pulse Code Modulation System for Short-Haul Tranks (BSTJ Jan. 1962).

Numeral 14 denotes a branch circuit,'such as a hybrid circuit, for branching the recovered analogue signal output from the amplifier 13 into an output terminal 15 and an input terminal 16 for a supervising circuit comprising a buffer 17; a modulator 18; a band pass filter 19; a level detector 20 of the pilot signal output from the band pass filter 19; and a buffer emplifier 24. The broken line between the PCM output terminal 7 and the PCM input terminal 8 denotes a transmission channel. The pilot signal for the level supervisory is applied to the terminal 1 and encoded together with the FDM signal through the well-known PCM coder including the constituents 2 to 6. The PCM output signal is transmitted through the transmission channel to the input terminal 8 of the receiving end, and demodulated through the PCM decoder including the constituents 9 to 13 and 21 to 23. The recovered FDM signal containing the pilot signal is delivered through the branching circuit 14 to the output terminal 15 and the supervising circuit input terminal 16.

The recovered FDM signal applied to supervising system input terminal 16 is supplied to the modulator 18 by way of the buffer 17 and there frequency modulated by a carrier wave obtained from the output of divider 23 which divides the output of counter 21. The counter 21 divides the clock frequency component extracted from the input PCM signal by the input pulse converter 9, as is well known. Assuming that the dividing factors of the counters 21 and 23 are $N_1$ and $N_2$ respectively and the clock frequency is $fo$, the carrier frequency $fc$ supplied to the modulator 18 through a buffer 24 from the divider 23 is expressed as $$fc = fo/(N_1N_2).$$

For example, the transmission band width is 312–552 kHz; the pilot signal frequency, 411.92 kHz; $fo = 7.876$ MHz; $N_1 = 13$; $N_2 = 2$; and the carrier frequency fc; $7.876 \times 10^6/(13 \times 2) = 302.92 \times 10^3$ (Hz). In this case, the pilot signal frequency included in the transmission band width is converted from 411.92 kHz to (411.92 – 302.92) kHz namely 109 kHz. Therefore, the band width ratio can be enlarged as much as four times the band width ratio prior to the frequency shift. The center frequency of the band pass filter 19 is set to 109 kHz to satisfy the required selecting characteristic. The output level of the band pass filter 19 is rectified by the detector 20 to supervise the level of the FDM signal by the rectified DC signal of the pilot signal. Then, the carrier frequency is selected to be one-half the sampling frequency. It is well known that, in the PCM communication systems, frequency components with an arbitrary multiple of one-half the sampling frequency are always outside the transmission signal band. The selection of a carrier wave having such a particular frequency is very effective against the leakage of high order frequency components of the carrier (*fc*) into the FDM signal.

Figure 2:
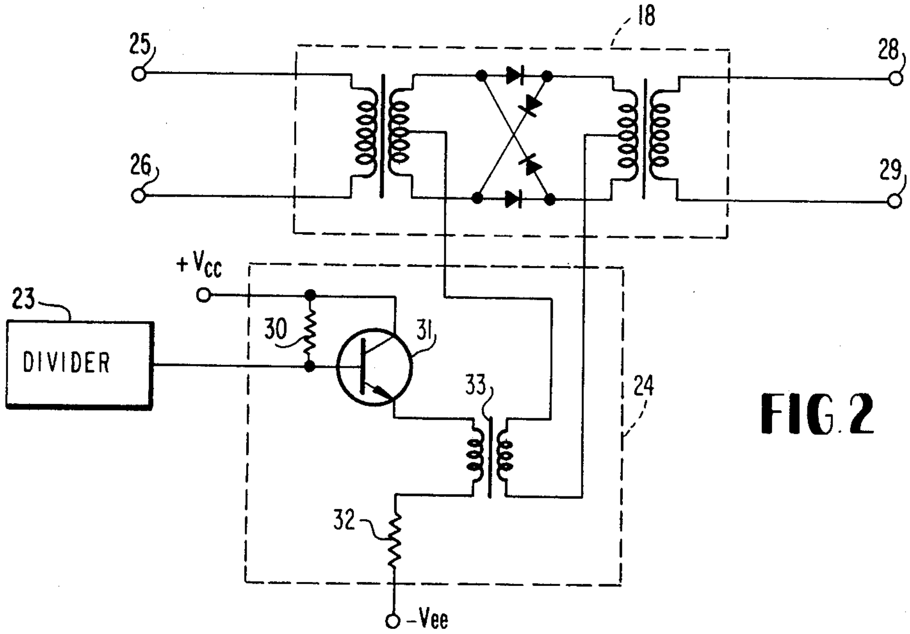
FIG. 2 is a detailed circuit diagram of a part of the embodiment of FIG. 1.

FIG. 2 illustrates a detailed circuit of a part of the supervising circuit. The identical numerals as in FIG. 1 are used in FIG. 2 to illustrate the identical constituents. The output signal from the divider 23 is applied to the buffer 24 encluding resistors 30 and 32, a transistor 31 and a transformer 33. The output signal is applied to a well-known ring modulator 18 as the carrier thereof. The input terminals 25 and 26 of the modulator 18 are connected to the buffer 17, while the output terminals 28 and 29 of the modulator 18 are connected to the band pass filter 19 respectively. The buffer 17 may be constructed as the buffer 24.

According to the present invention, since the carrier wave is obtained from the pulse source controlling the PCM communication system by installing only the simple buffer 24, a supervising system with high reliability is obtained. Furthermore, the selection of the carrier wave with one-half the sampling frequency is effective against the leakage of high order frequency components of the carrier wave into the FDM signal.

What is claimed is:

1. A level supervising system for a pulse code modulation communication system transmitting a frequency division multiplex signal containing a pilot signal, comprising, at the receiving end of said pulse code modulation communication system, means for frequency-shifting the recovered frequency division multiplexed signal in the direction of extending band width ratio for the extraction of said pilot signal using a carrier wave, means for deriving said carrier wave from a pulse source controlling the pulse code modulation system and means for extracting said pilot from the frequency-shifted frequency division multiplex signal.

2. The level supervising system as claimed in claim 1, wherein said means for deriving said carrier wave includes means for producing a carrier wave of a frequency equal to one-half the sampling frequency of said pulse code modulation system.

3. In a pulse code modulation receiver for demodulating a pulse code modulated analog signal including a fixed frequency and level pilot signal for use in a signal level supervising system, a pilot signal recovery system comprising;

means for frequency shifting the demodulated analog signal in a direction to cause an increase in the signal bandwidth ratio, said means including means for deriving a carrier signal from a pulse source controlling the pulse code modulation receiver, and means for extracting said pilot signal from said frequency shifted analog signal.

4. The pilot signal recovery system of claim 3 wherein said means for frequency shifting includes modulator means for modulating said demodulated analog signal with said derived carrier, said means for deriving a carrier signal including divider means, responsive to the clock signal of said pulse code modulated signal, for frequency dividing said clock signal and buffer amplifier means responsive to said reduced frequency clock signal for supplying said carrier signal to said modulator means.

5. The pilot signal recovery system of claim 4 wherein said divider means includes means for reducing the clock signal frequency to one-half of the sampling frequency of said pulse modulation receiver.

6. The pilot signal recovery system of claim 5 wherein said analog signal is a frequency division multiplex signal containing said pilot signal, said modulator means comprising means for modulating the recovered frequency division multiplex signal with said derived carrier signal.

7. In a pulse code modulation system, a pulse code modulation receiver for decoding a received pulse code modulation signal representing a frequency division multiplex signal including a pilot signal for signal level supervision, said receiver including a pilot signal recovery system comprising;

a. means for recovering the pulse code modulation clock signal, b. means for reducing the frequency of said recovered clock signal, c. means for deriving a carrier signal from said reduced frequency clock signal, d. means for modulating the decoded frequency division multiplex signal with said derived carrier to frequency shift the frequency division multiplex signal in a direction to increase the bandwidth ratio, and e. means for extracting the pilot signal from said frequency shifted frequency division multiplex signal.

8. In a pulse code modulation system, a method for recovering a signal level supervising pilot signal from a pulse code modulated analog signal including a pilot signal comprising the steps of;

a. demodulating said pulse code modulated signal to recover said analog signal, b. modulating said analog signal with a carrier derived from a pulse source used in the control of the pulse code modulation system to frequency shift the analog signal in a direction to increase the signal bandwidth ratio, and c. extracting said pilot signal from said frequency shifted signal.

9. The method of claim 8 wherein said carrier is derived by frequency dividing the clock signal of said pulse code modulated signal.

10. The method of claim 9 wherein the frequency of said carrier is made to correspond to one-half the sampling frequency of the pulse code modulation system.

* * * * *

UNITED STATES PATENT OFFICE
CERTIFICATE OF CORRECTION

Patent No. 3,743,786 Dated July 3, 1973

Inventor(s) Ken-ichi HIRATSUKA et al

It is certified that error appears in the above-identified patent and that said Letters Patent are hereby corrected as shown below:

In The Specification:

Column 1, in the title -- "Communicating" should be -- Communication-

Column 2, line 22 - no semicolon after "generator"

Column 2, line 38 - "emplifier" should be -- amplifier --

Column 3, line 26 - "encluding" should be -- including --

Signed and sealed this 20th day of November 1973.

(SEAL)
Attest:

EDWARD M.FLETCHER,JR.
Attesting Officer

RENE D. TEGTMEYER
Acting Commissioner of Patents

USCOMM-DC 60376-P69
☆ U.S. GOVERNMENT PRINTING OFFICE : 1969 O—366-334.